United States Patent [19]

Oser

[11] 4,403,275

[45] Sep. 6, 1983

[54] WATTLESS LAMP ASSEMBLY

[75] Inventor: Neil J. Oser, Pleasantville, N.Y.

[73] Assignee: FAO, Inc., Hawthorne, N.Y.

[21] Appl. No.: 244,275

[22] Filed: Mar. 16, 1981

[51] Int. Cl.³ .............................................. F21S 3/00
[52] U.S. Cl. ..................................... 362/220; 362/225;
362/368; 362/226; 362/457; 362/240; 362/280;
362/285; 362/254; 362/346
[58] Field of Search ............... 362/217, 219, 220, 225,
362/226, 238, 239, 240, 280, 285, 234, 254, 346,
368, 372, 277, 457, 319

[56] References Cited

U.S. PATENT DOCUMENTS

| | | | |
|---|---|---|---|
| 2,926,238 | 2/1960 | Anderson et al. | 362/217 |
| 3,829,680 | 8/1974 | Jones . | |
| 3,956,665 | 5/1976 | Westphal . | |
| 4,191,989 | 3/1980 | Page et al. | 362/220 |
| 4,240,130 | 12/1980 | Stilling | 362/217 |
| 4,336,576 | 6/1982 | Crabtree | 362/241 X |

OTHER PUBLICATIONS

*Ballasts for Fluorescent Lamps-Competitive Cross Reference*, G.E. Brochure, Designated 20S-8068R.
Watt-Miser F40 Fluorescents, G.E. Brochure, Designated 205-9281, Aug. 79.
Alcoa Brochure, Designated Form F10-13729.

*Primary Examiner*—Peter A. Nelson

[57] ABSTRACT

A multi-lamp fluorescent fixture including one or more reflecting assemblies introduced into the fixture in place of removed fluorescent lamps and configured to redirect outwardly from said fixture to the areas intended to be illuminated a substantial portion of the illumination received from the lamps remaining therein which would otherwise be directed and absorbed within the fixture.

13 Claims, 7 Drawing Figures

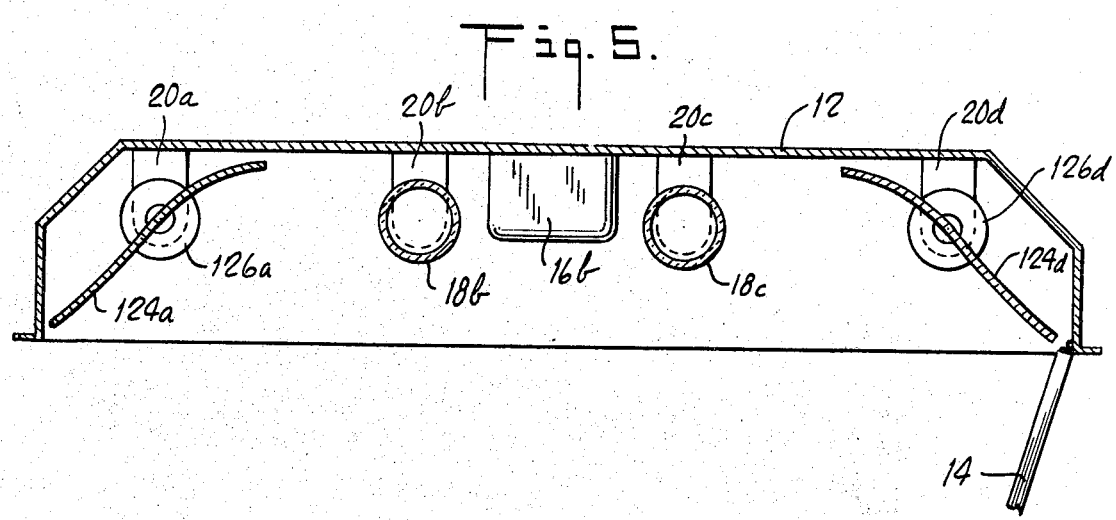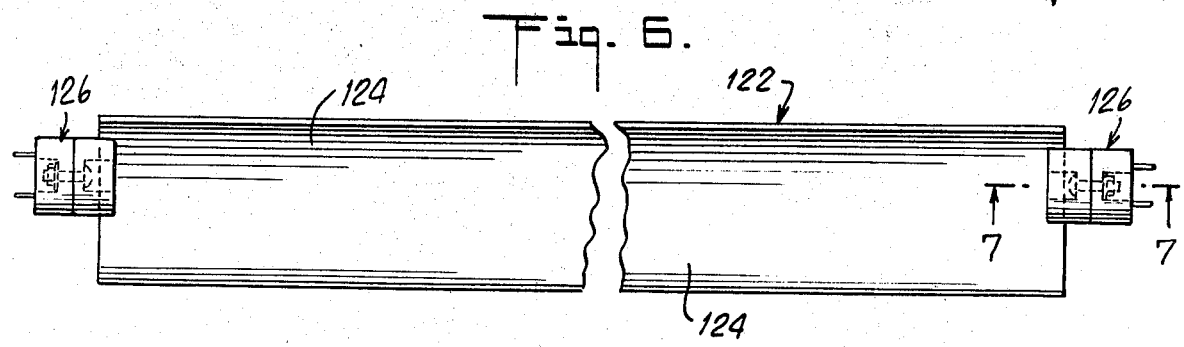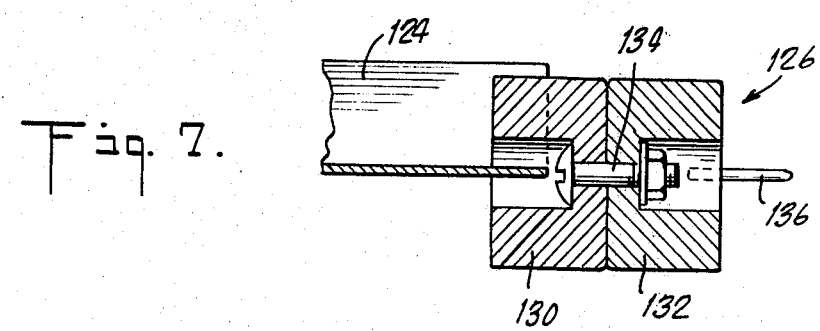

WATTLESS LAMP ASSEMBLY

BACKGROUND AND SUMMARY OF THE INVENTION

The invention is in the field of fluorescent lighting fixtures. It is particularly concerned with a multi-lamp fluorescent fixture incorporating a reflective assembly in place of a fluorescent lamp to increase the lighting efficiency of the fixture within the remaining lamps.

Fluorescent lighting lighting fixtures have been and are extensively used in office, factory and residential lighting. The most popular type of fluorescent is the four-lamp two-ballast (transformer) fixture. It has been estimated that there are over one billion such fixtures installed in the United States and between 100 and 200 million are manufactured annually. The four-lamp two-ballast fixture is manufactured in different sizes with a variety of different lenses, reflectors, ballasts and lamps being available. The greater number of such fixtures have been made in width and length dimensions of 1'×4' and 2'×2' to be recessed to fit in a suspended ceiling. In these fixtures, each of the ballasts independently activates two fluorescent lamps connected in series. In most instances, one ballast controls the two outer lamps.

As a result of the "energy crisis"]and the ever increasing cost of electrical power generation, electrical energy users, including users of fluorescent lighting, have sought by various means to control their energy costs, e.g., by decreasing their electrical energy consumption. As a means to this end, users of fluorescent lighting have accepted reductions in illumination levels in various areas in office and factories where the reduction does not create an unacceptable level of light. A reduction in illumination is possible because in most instances, existing office and factory areas are overlit by present day lighting standards.

One particular method in the prior art of reducing illumination levels is by the removal of one or more lamps from a multi-lamp fluorescent fixture. In the case of a standard two-lamp fluroscent fixture, however, the two lamps are electrically connected in series; by removing one lamp the entire fixture is electrically disconnected. Consequently, "dead spaces"]are created in the areas the fixture was intended to illuminate. In a standard four-lamp fixture, in a manner similar to the two-lamp fixture, two lamps are electrically connected in series. If one lamp is removed, the connected second lamp is disabled, thus leaving the two other remaining lamps active and resulting in a 50% reduction in illumination. This type of arrangement, however, will result in an underdistribution of light. Moreover, an expected reduction in power consumption is not attained since the ballast associated with the two disconnected lamps is wired across the external power line to the fixture and consumes power even when the lamps are disconnected.

Other products comprising improvements in existing components of fluorescent lighting fixtures have been marketed as a further means for reducing energy lighting costs. For example, more energy efficient ballasts, see, e.g., "Ballasts for Fluorescent Lamps—Competitive Cross Reference," General Electric brochure, designated 20S-8068R, and fluorescent lamps, see, e.g., "Watt-Miser F40 Fluorescents", General Electric brochure, designated 205-9281 8/79 have become available. Further, in Jones U.S. Pat. No. 3,829,680 a plastic lighting panel is disclosed which minimizes ceiling reflections. In Westphal U.S. Pat. No. 3,956,665 a glass tube, the same shape and size of a fluorscent lamp, which encloses a capacitor within, produces no illumination but is installed in a standard lamp fixture in place of a fluorescent lamp. This arrangement permits both ballasts of a four-lamp two-ballast fixture to operate with the other three remaining lamps by converting the normal two-lamp ballast to a one-lamp ballast. What remains is a three-lamp fluorescent fixture operating on two ballasts.

Although a number of improved fluorescent lighting fixtures have become available, there is a need for a fluorescent lighting fixture which is more efficient than those products known to applicant, inexpensive, will extend the life of its major components, reduce maintenance and replacement costs, all without materially reducing the illumination produced to an unacceptable level. The invention is directed to providing a fixture meeting such needs.

One specific embodiment of the invention is a fluorescent lighting fixture which comprises a housing, a swinging door attached thereto including a lens, two ballasts, four standard fluorescent lamps and four corresponding pairs of lamp holders which support and engage the lamps. The fixture is controlled, for example, by a light switch which energizes both of the ballasts. It is usually the case that one ballast energizes the two outer lamps while the other energizes the two inner lamps. Two of the lamps, for example, the outer lamps, are removed and in place of each is inserted a reflecting assembly. Each reflecting assembly is comprised of a rigid reflecting surface and a cap at each longitudinal end thereof. The reflecting surface is variously configured, e.g., concave-convex along the longitudinal length of the remaining inner lamps, to redirect downwardly from said assembly to the areas intended to be illuminated, a substantial portion of the illumination received from the lamps remaining in the fixture which would otherwise be directed upwardly and be absorbed within the housing. The reflecting surface may be made from a highly reflective metal material, such as aluminum having a surface coating of anodic oxide. The caps are attached to the longitudinal ends of the reflective surface and may be made of a non-conductive flexible or plexiglass material. The total longitudinal length of the reflecting surface and caps is substantially equal to that of the fluorescent lamp which it replaces.

In operation, the selected lamp is removed and in its place is inserted the reflecting assembly. The caps are introduced into the respective lamp holders which support the assembly at both ends and are locked into place. The caps may be formed such that they do not contact the live elements of the lamp holder. The ballast which ordinarily powers, through the contact holders, the replaced lamps is optionally disconnected out of the circuit by removing the ballast leads, which in all instances is accessible to the user. This eliminates the power drain of the ballast even when the lamps have been deactivated.

BRIEF DESCRIPTION OF THE DRAWINGS

FIG. 5 is a sectional view, similar to FIG. 3, of one preferred embodiment of the invented fluorescent lighting fixture.

FIG. 6 is a side view of a preferred reflective surface and end caps forming a part of the fixture shown in FIG. 5.

FIG. 7 is a sectional view of one preferred holder taken along line 7—7 of FIG. 6.

DETAILED DESCRIPTION

Figure 1:
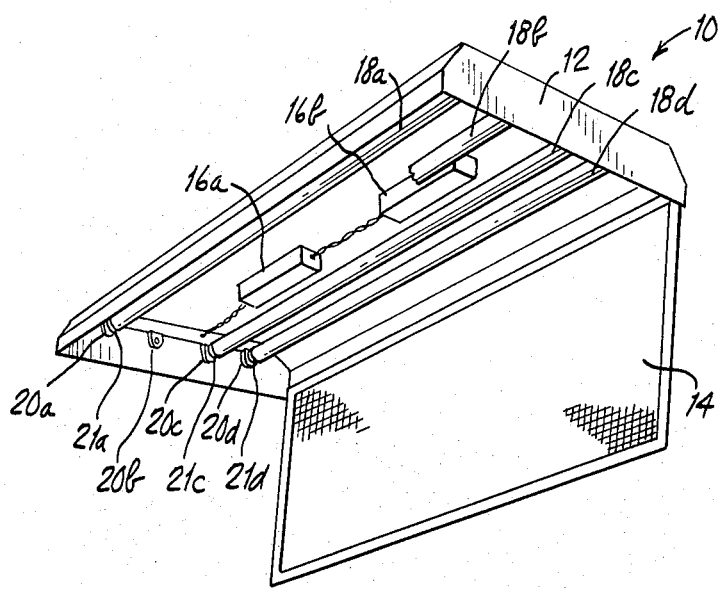
FIG. 1 is a perspective view of a prior art fluorescent lighting fixture.

Referring to FIG. 1, a prior art four-lamp two-ballast fluorescent lighting fixture 10, sometimes more particularly referred to as a framed door troffer and which comprises a die-formed steel embossed housing 12 having a baked white enamel coating on its inner surface, a latched free-swinging door 14 hinged thereto including, for example, an acrylic or polystyrene lens, two ballasts 16a and 16b, four standard fluorescent lamps 18a–18d and four corresponding pairs of lamp holders 20a–20d (only one lamp holder of each pair is visible in the figures) which engage and support and include electrical contacts to energize the lamps 18a–18d. Each lamp 18 has a cap 21 carrying two pins (not shown) at its longitudinal ends. The pins extend through the cap 21 and are connected to the lamp filament. Each lamp 18 is introduced into the fixture 10 by inserting the exposed end of the pins in the corresponding pair of lamp holders 20 and generally, rotating the lamp 18 90° so that the pins are properly engaged to support the lamp 18 and make electrical contact with the conductive element of each lamp holder 20. Standard fluorescent lamps 18 are available in various diameters and lengths, such as 24, 36, 48 and 96 inches, and are available with nominal wattage ratings of 20, 30, 40 or 75 watts to satisfy varying lighting requirements. The fixture 10 is controlled, for example, by a light switch which energizes the ballasts 16. Ballast 16a is connected in series to the two outer lamps 18a and 18d, while ballast 16b is similarly connected to the two inner lamps 18b and 18c.

Figure 2:
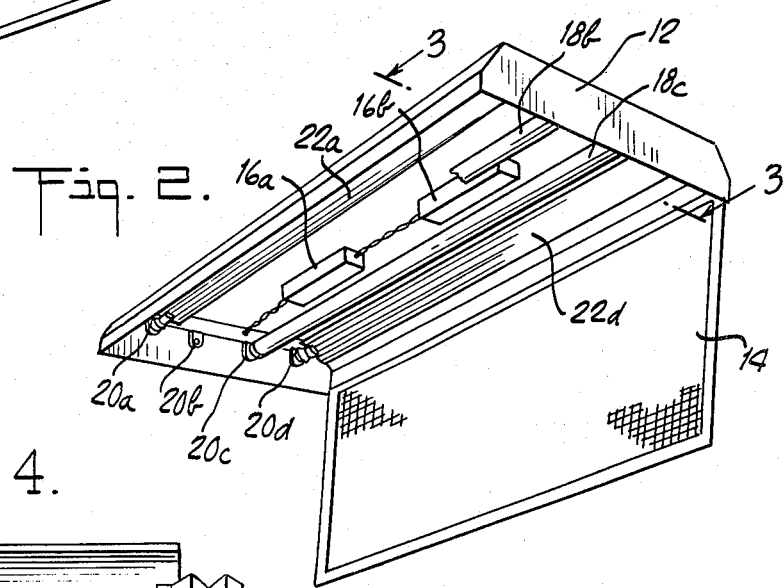
FIG. 2 is a perspective view of an embodiment of the invented fluorescent lighting fixture.
Figure 4:
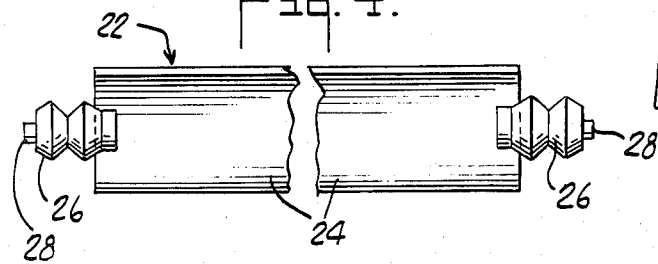
FIG. 4 is a side view of the reflective surface and end caps forming a part of the fixture shown in FIG. 2.
Figure 3:
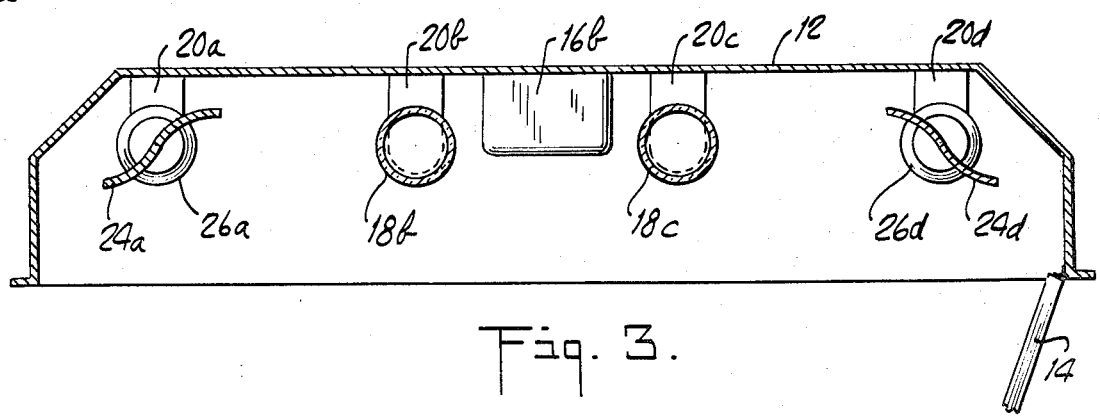
FIG. 3 is a sectional view taken along line 3—3 of FIG. 2.

Referring to FIGS. 2, 3 and 4, where like numerals designate the same items referred to FIG. 1, a lighting fixture according to the invention includes reflecting assemblies 22a and 22d in place of the removed lamps 18a and 18d. Reflecting assembly 22 is comprised of a rigid reflecting surface 24 and a flexible cap 26 at each longitudinal end thereof. The reflecting surfaces 24a and 24d have a concave-convex shape along their longitudinal lengths to redirect downwardly from said assemblies 22a and 22d to the intended areas to be illuminated, a substantial portion of the illumination received from lamps 18b and 18c, respectively, which would otherwise be directed upwardly and be absorbed within the housing 12. Reflecting surface 24 may be made from a highly reflective material, such as aluminum with a surface coating of anodic oxide. Such a preferred material is sold in sheet form by Aluminum Company of America (Alcoa) under the trademark COILZAK and its properties are described in an Alcoa brochure designated Form F10-13729. The caps 26, which may be made of flexible non-conductive material such as rubber, for example, are attached, with a silicone gel glue, to the longitudinal ends of the reflecting surface 24. The outer ends of the caps 26 are shaped in the form of a key 28. The total longitudinal length of the reflecting surface 24 and caps 26 is substantially equal to that of the fluorescent lamp 18 which it replaces.

In operation, the selected lamp 18 to be removed is replaced by the reflecting assembly 22. The caps 26 are compressed in the longitudinal direction so that the keys 28 may be introduced at both ends and locked into the corresponding pair of holders 20 which support the assembly 22. The keys 28 are constructed such that they do not contact the live electrical contacts of the holder 20. The ballast 16a which ordinarily powers the replaced lamps 18a and 18d through the contacts of lamp holders 20a and 20d, respectively may be disconnected from the circuit by removing the ballast leads which are in many instances accessible to the user. This is further advantageous since the power loss through the ballast 16a, notwithstanding the lamps 18a and 18d are removed, is eliminated. With the ballast 16a disconnected, it remains attached to the housing 12 for use, along with the replaced lamps 18a and 18d, when the remaining active components, i.e., lamps 18b and 18c and ballast 16b, burn out. While the reflecting assemblies 22a and 22d have been shown in place of outer lamps 18a and 18d, should it be desired the assembly 22 may be introduced in place of lamps 18b and 18c, leaving the remaining lamps 18a and 18d to produce the illumination that is to be reflected by the assemblies.

Referring to FIGS. 5, 6 and 7, one preferred embodiment of the subject invention is disclosed. The reflecting assembly 122 is comprised of a rigid reflecting surface 124 and a two-piece cap 126 at each longitudinal end thereof. The reflecting surfaces 124a and 124d have a shape as drawn in FIG. 5 to the scale of 3:1 of actual size. In the same manner as disclosed with respect to the first embodiment of the invention shown in FIGS. 2, 3 and 4, the reflecting surfaces 124a and 124d redirect downwardly from said assemblies 122a and 122d to the intended areas to be illuminated, a substantial portion of the illumination received from lamps 18b and 18c, respectively would otherwise be directed upwardly and be absorbed within the housing 12. The caps 126 are assembled from sections 130 and 132, made of medium density polystyrene. A screw, nut and lock washer assembly 134 holds the sections 130 and 132 together. Section 132 includes two holes in which pins 136 are inserted and held therein by glue.

In operation, the lamp 18 is removed and replaced with the reflecting assembly 122. The two pins 136 are introduced into the lamp holders 20 in the same manner as the replaced lamps 18. The section 132 is rotated 90°, while the assembly 122 remains in its operative position, locking it into the holders 20.

In an exemplary test, using the prior art fixture 10 described in connection with FIG. 1, with four 40 watt 48" long 1.5" diameter cool white rapid start lamps (F40CW) active, the average illumination, on a 4' diameter circle, 5' 3" below the lamps 18, measured 45.2 footcandles at an applied voltage of 118 volts at 60 Hz. and 1.526 amperes. The power consumption is 180.07 watts and the lighting efficiency is 0.25 footcandles/watt.

With regard to the preferred embodiment of the invention, described in connection with FIGS. 5, 6 and 7, with two F40CW lamps 18 active, and only the ballast 16b active, the average illumination on a 4' diameter circle, 5'3" below the lamps 18, measured 32.6 footcandles at an applied voltage of 118 volts at 60 Hz. and 0.763 amperes. The power consumption is 90.034 watts and the lighting efficiency is 0.362 footcandles/watt.

Thus, the lighting efficiency of the preferred embodiment of the subject invention is improved 44.8 percent. Stated somewhat differently, it should be appreciated that by replacing lamps 18a and 18d with reflective assemblies 122a and 122d and deactivating ballast 16a, 32.6/45.2=72.1% of the illumination is provided with 90.034/180.07=49.9% of the power.

This invented fixture is not limited to retrofitting fixtures already installed. For example, newly manufactured fluorescent fixtures would comprise two fluorescent lamps 18, four pairs of lamp holders 20, only two of which would be electrically wired, and one ballast 16. The reflective assemblies 122, for example, would be introduced into and supported by the two unwired holders 20 in the same manner as described above.

It shall be appreciated that the subject invention provides a fluorescent lamp fixture which is efficient, inexpensive and does not materially reduce the illumination produced. A further advantage of the subject invention is that it provides for a uniform distribution of light even with only two lamps remaining in operation.

Although two specific embodiments of the invention have been disclosed herein for purposes of explanation, various modifications, without departing from the spirit or essential attributes thereof, will be apparent to those skilled in the art to which the invention pertains.

I claim:

1. A multi-lamp fixture accommodating at least two fluorescent lamps comprising:
   lamp holding means adapted to receive said lamps;
   circuit means connected to said holding means for supplying electrical power to said lamps;
   reflecting means introduced into said fixture and having longitudinally spaced ends received by the portion of said holding means adapted to hold a fluorescent lamp in place of a removed fluorescent lamp, configured to reflect outwardly from said fixture to the intended areas to be illuminated a substantial portion of the illumination received from the lamp or lamps remaining therein which would otherwise be absorbed within the fixture.

2. A fixture as in claim 1, wherein the reflecting means includes a reflecting surface spaced laterally from and positioned along substantially the entire longitudinal length of the remaining lamp or lamps in the fixture.

3. A fixture as in claim 2, wherein the reflecting surface is made of an aluminum alloy.

4. A fixture as in claim 2, wherein the longitudinal ends of the reflecting means includes supporting caps attached to the longitudinal ends of the reflecting surface, to be inserted into the respective portion of the lamp holding means from which a fluorescent lamp has been removed.

5. An assembly, for replacing a fluorescent lamp which is removed from a multi-lamp fixture including a lamp holder for each lamp, for improving the lighting efficiency of the fixture comprising:
   reflecting means configured to reflect outwardly from said fixture to the intended areas to be illuminated a substantial portion of the illumination received fronm the remaining lamps which would otherwise be absorbed within the fixture;
   means at the longitudinal ends of the assembly adapted for insertion into the lamp holder for a lamp removed from the fixture to thereby have the fixture support the assembly in place of the removed lamp.

6. An assembly as in claim 5, wherein the reflecting means includes a reflecting surface adapted to be spaced laterally from and positioned along substantially the entire longitudinal length of the remaining lamp or lamps in the fixture when the assembly is supported in the fixture in place of a removed lamp.

7. An assembly as in claim 6, wherein the reflecting surface is made of an aluminum alloy.

8. An assembly as in claim 6, wherein said means at the longitudinal ends of the assembly comprise caps attached to the reflecting surface and adapted to be inserted into said lamp holding means.

9. A fixture including at least two fluorescent lamps and respective holding means adapted to receive each lamp comprising:
   reflecting means introduced in place of a selected removed one of said fluorescent lamps, configured so as to reflect outwardly from said fixture to the intended areas to be illuminated a substantial portion of the illumination received from the remaining lamp or lamps which would otherwise be absorbed within the fixture;
   means for supporting the reflecting means comprising means at the longitudinal ends of the reflecting means received by the holding means for the removed lamp.

10. A fixture as in claim 9, wherein the reflecting means includes a reflecting surface spaced laterally from and positioned along substantially the entire longitudinal length of the remaining lamps in the fixture.

11. A fixture as in claim 10, wherein the reflecting surface is made of an aluminum alloy.

12. A fixture as in claim 10, wherein the supporting means includes caps, attached to the longitudinal ends of the reflecting surface, to be inserted into said lamp holding means.

13. A method of providing a more efficient multi-lamp fluorescent lamp fixture including a number of respective holding means each adapted to receive a respective fluorescent lamp and circuit means connected to said holding means for supplying electrical power to said lamp comprising the step of:
   introducing into said fixture, in place of a selected fluorescent lamp, reflecting means having a configuration for reflecting outwardly from said fixture to the intended areas to be illuminated a substantial portion of the illumination received from the remaining lamps which would otherwise be absorbed within the fixture, and supporting the reflecting means in the fixture by engaging its longitudinal end with the respective holding means for the removed lamp.

* * * * *